Figure 1:
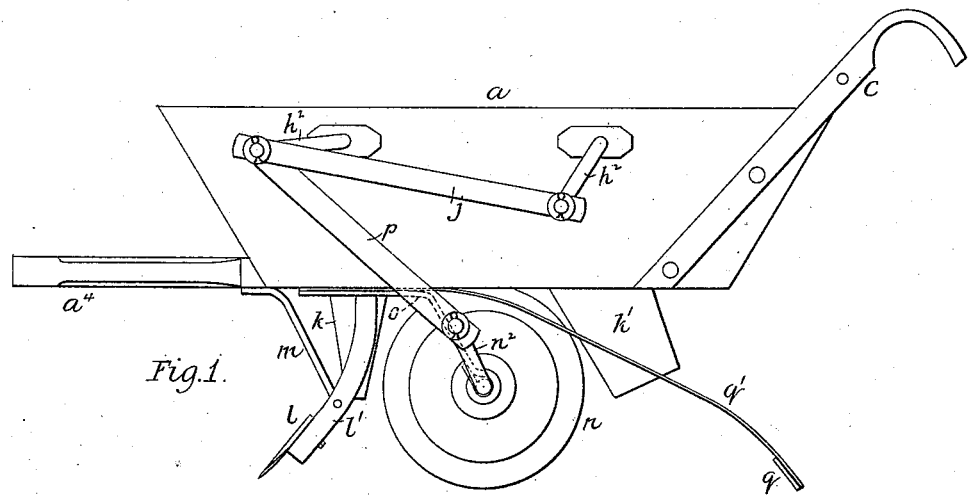

(No Model.) 2 Sheets—Sheet 1.

W. H. BAKER.
COMBINED PLANTER AND FERTILIZER DISTRIBUTER.

No. 546,646. Patented Sept. 24, 1895.

Witnesses

Inventor
William H. Baker
By Audley & Co
his Attorneys (No Model.) 2 Sheets—Sheet 2.

W. H. BAKER.
COMBINED PLANTER AND FERTILIZER DISTRIBUTER.

No. 546,646. Patented Sept. 24, 1895.

Witnesses

Inventor
William H. Baker
By Dudley & Co.
his Attorneys

UNITED STATES PATENT OFFICE.

WILLIAM H. BAKER, OF STILESBOROUGH, GEORGIA.

COMBINED PLANTER AND FERTILIZER-DISTRIBUTER.

SPECIFICATION forming part of Letters Patent No. 546,646, dated September 24, 1895.

Application filed November 11, 1893. Serial No. 490,647. (No model.)

*To all whom it may concern:*

Be it known that I, WILLIAM H. BAKER, a citizen of the United States, residing at Stilesborough, in the county of Bartow and State of Georgia, have invented certain new and useful Improvements in a Combined Planter and Fertilizer-Distributer; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention is directed to that class of planters in which provision is made for depositing simultaneously seed and guano or other fertilizer, with the object of diminishing time and labor by combining the two operations in one machine. Heretofore in machines of this character it has been the practice to plant the seed in advance of distributing the fertilizer, the latter after the operation being in direct contact with the seed. This system is attended with serious difficulties, owing to the tendency of the fertilizer to rot the seed or stunt the growth of the plant, and the fertilizer being above the seed and covered by the earth the former is confined and has no tendency toward an even fertilization.

My invention has for its object to remedy such difficulties and to combine the fertilizer with the seed in a manner to produce the best results. To attain this end I have reversed the operations, or, in other words, have produced a machine of new and novel construction, in which the fertilizer is first deposited and the seed last, and direct contact between the two deposits is prevented by "letting in" a sufficient quantity of earth between the fertilizer and seed, and which is accomplished also by my improved machine. By this process the seed is planted at only such a depth as will tend to promote growth, and the fertilizer is combined with the earth in such a manner that the ground enriched covers a greater area than is possible in the use of machines now in general use.

The machine, which is the result of my invention, consists, generally, of a box divided by a partition into two hoppers, the forward one for the fertilizer and the rearward one for the seed, an adjustable opener-plow, two distributers, one for each hopper, of peculiar construction, means for adjusting the distribution of the fertilizer and seed, and improved means for actuating the distributers.

Figure 2:
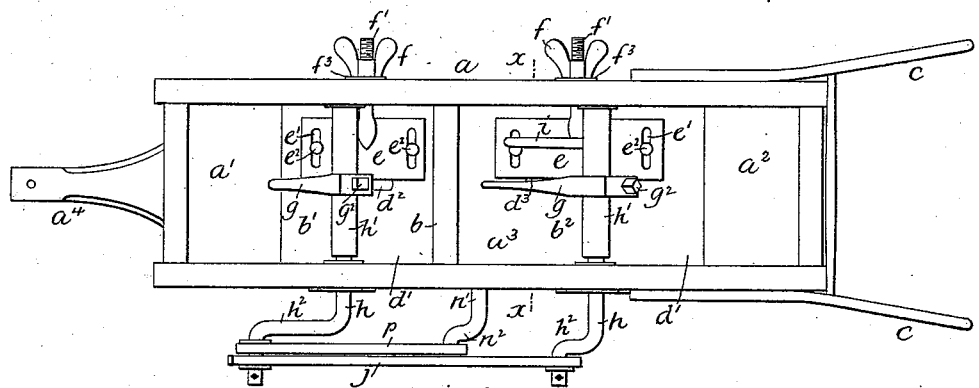
Figure 3:
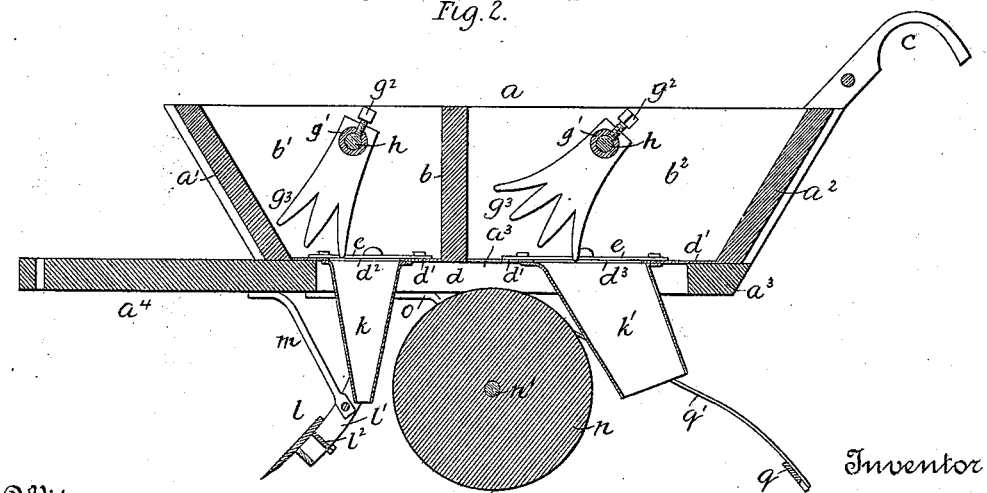
Figure 4:
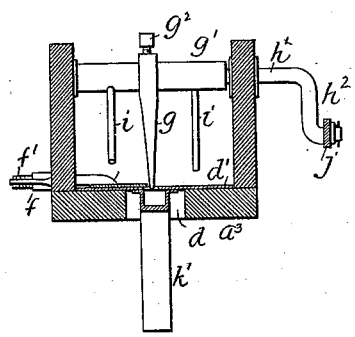
Figure 5:
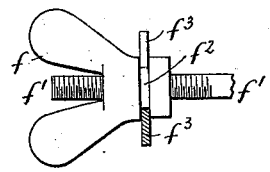

The combination, relative arrangement, and operation of the several parts of my machine will now be fully and clearly described, and attention is called to the accompanying drawings, which form a part of this specification, and in which the invention is illustrated, as follows:

Figure 1 is a side elevation of my improved machine. Fig. 2 is a plan view of the same. Fig. 3 is a vertical central longitudinal sectional view. Fig. 4 is a sectional view taken on line $x\ x$ of Fig. 2, and Fig. 5 is a detail view.

The same letters of reference denote the same parts in the figures of the drawings.

The letter $a$ denotes the box, the ends $a'\ a^2$ of which are made upwardly flaring, and by means of a partition $b$ the box is converted into two hoppers, the forward one $b'$ for the fertilizer and the rearward one $b^2$ for the seed. The box forms, also, the frame of the machine, all of the operative parts being connected thereto, and the bottom $a^3$ is extended forwardly and reduced to form a tongue $a^4$ for connection with horse-attaching devices. Handles $c$ are connected to the sides of the box at the rearward end, and serve as a means for guiding and maintaining the upright position of the machine. The bottom of the box is centrally cut away at $d$ for a portion of its length to accommodate certain of the parts in order to reduce the height of the machine, and a metallic plate $d'$ is secured to the upper surface of said bottom to reduce the liability of wear. Slots $d^2\ d^3$ are made in said plate respectively for the fertilizer-hopper and the seed-hopper, and the width of these slots is made adjustable in order to control the deposits. This adjustability is permitted by means of plates $e\ e$, one for each slot, which are moved inwardly or outwardly at pleasure by means of thumb-screws $f$ or similar devices acting with screw-threaded spindles $f'$, secured at one end to said plates and passed through the sides of the box. The thumb-screws are each provided with an annular groove $f^2$, which is engaged by a plate $f^3$, secured to the side of the box and which permits a rotation of the thumb-screw, but prevents any longitudinal movement, so that its rotation will cause the spindle to move inward or outward and carry with it the plate. Each of the plates has slots $e'$, through which are passed headed guide-pins $e^2$, which operate to steady the plate when the same is being moved.

The distributers are shown at $g$ and are secured to the crank-shafts $h\ h$, journaled in the upper end of the sides. The distributers have integral sleeves $g'$, which surround the shafts, and set-screws $g^2$ are provided for a firm connection thereto. The fingers $g^3$ of the distributers are of sufficient length to extend during a part of their movement within the slots in order to facilitate the discharge of the contents of the hoppers, and in connection with the distributer for the seed I employ two auxiliary fingers $i\ i$, which are secured to the sleeve $g'$ and operate to loosen the body of seed. At the outer end of the shafts and beyond the side are cranks $h^2$, which are connected by a rod $j$, which permits of their simultaneous movement.

From the bottom of the hoppers extend downward chutes $k\ k'$, by which the deposits are directed, and the sides of these chutes are preferably inclined toward each other in order to retard the flow of guano or seed. Adjacent to the chute $k$ is the opener-plow $l$, by which the rows are laid off and the ground opened to admit the fertilizer and seed. The plow-standard $l'$ is divided at its upper end to admit the chute $k$ and is connected to the sides of the slot or opening $d$, and further connected by a brace-rod $m$ to the tongue. The lower end of the standard is slotted to receive a pin $l^2$ on the plow, and by means of this pin and slot a vertical adjustment of the plow with relation to the ground is permitted.

$n$ is the drive-wheel, the axle $n'$ of which is mounted in brackets $o$, secured to the under side of the box at each side of the opening $d$. The axle is extended at one side and has a crank $n^2$ thereon, which is connected by means of a rod $p$ to the forward crank $h^2$, and by this connection motion is imparted to the distributers simultaneously by the revolution of the wheel. The wheel not only serves to actuate the mechanism stated, but "lets in" a quantity of earth after the fertilizer has been deposited, so that the seed falls not in the fertilizer, but upon a layer of earth, and thus its contact with the guano is prevented until the latter becomes in some degree admixed with the soil.

$q$ is the drag or coverer, which is connected to the under side of the box by spring-arms $q'$, which permit of an adjustment to the surface of the ground.

The operation of my machine will be readily understood by those versed in the art, and the advantages of my machine are at once apparent from a reading of the foregoing.

The combined operations in one machine reduce time and labor and avoid the necessity of employing different machines for laying off the rows, fertilizing, and planting. The adjustable slots permit of the depositing of seed and guano in any desired quantity, and the fertilizing being done in advance of the planting all liability of killing the seed or of stunting the growth of the plant is prevented. The seed cannot be planted too deeply, and hence cannot become choked.

The machine is also simple in construction, effective in operation, easily handled, and is durable.

What I claim as my invention is—

In a combined planter and fertilizer distributer, the combination of the two-compartment hopper, the vertical conical chute depending from the bottom of the fertilizer-compartment, the inclined chute depending from the bottom of the seed-compartment, the coverer arranged in rear of the seed-chute and carried by said hopper, the covering wheel upon which the hopper is supported, arranged intermediately of said chutes, the distributers or stirrers arranged in vertical alignment with said chutes and carried by reciprocating crank-shafts, the fingers of said distributers reaching into the fertilizer and seed dropping openings or slots in the bottom of hopper, said crank-shafts being connected together by a rod and actuated by a pitman connected to the forward one of said crank-shafts and a crank-extension of the covering wheel shaft, the opener-plow with its standard adapted to permit the fertilizer-chute to pass therethrough, and itself having a pin and slot connection with said standard, and the regulating slides arranged over the seed and fertilizer dropping openings in the hopper, and having slots receiving pins projecting from the bottom of said hopper, and screw-threaded spindles secured to said slides and fitted with thumb-nuts, having therein annular grooves engaged by plates fixed to said hopper, substantially as set forth.

In testimony whereof I affix my signature in presence of two witnesses.

WILLIAM H. BAKER.

Witnesses:
H. H. MILAM,
D. T. BRANDON.